T. P. SHAFFNER.
PROCESS OF BLASTING WITH NITROLEUM.
No. 6,854. Reissued Jan. 11, 1876.
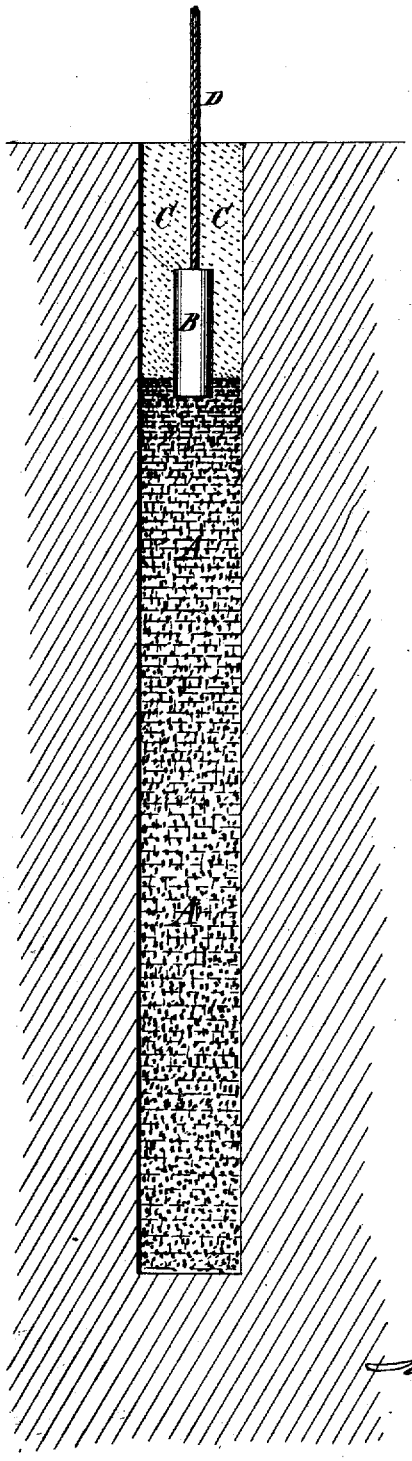
Witnesses
Inventor.
Theo. Shaffner
N. PETERS, PHOTO-LITHOGRAPHER, WASHINGTON, D. C.

UNITED STATES PATENT OFFICE.

TALIAFERRO P. SHAFFNER, OF LOUISVILLE, KENTUCKY, ASSIGNOR TO THE ATLANTIC GIANT-POWDER COMPANY, OF SAN FRANCISCO, CALIFORNIA.

IMPROVEMENT IN PROCESSES OF BLASTING WITH NITROLEUM.

Specification forming part of Letters Patent No. 60,573, dated December 18, 1866; reissue No. 3,374, dated April 13, 1869; reissue No. 6,854, dated January 11, 1876; application filed November 9, 1875.

DIVISION A.

*To all whom it may concern:*

Be it known that I, TALIAFERRO P. SHAFFNER, of Louisville, Jefferson county, and State of Kentucky, have discovered or invented a new and Improved Mode of Blasting with Nitroleum, consisting, first, in dividing the charge of nitroleum, so as to have a blasting-charge below and a tamping-charge above; secondly, in the method of tamping employed; and, thirdly, in the means employed for distributing the explosive force of a given charge of nitroleum throughout the bore-hole.

This reissue has reference to the means of distributing the explosive force of the charge, which I will proceed to describe so fully as to enable others skilled in the art to make use of my invention or discovery.

In Letters Patent reissue No. 3,375, granted to me April 13, 1869, being one of the divisions of the reissue of original Patent No. 60,573, I have described the method employed by me for tamping in blasting with nitro-glycerine, called by me "nitroleum," and the method of blasting with nitroleum by pouring the charge of nitroleum into the drill-hole, and then filling the hole with water, and placing a tamping-charge on top of the hole above the water. The result of this arrangement is, that the effective force of the charge is chiefly exhausted at the bottom of the hole, where the blasting-charge is situated. It is, however, frequently desirable to distribute the force of the explosion throughout the extent of the bore-hole, instead of confining it as much as possible to one spot. This I accomplish by pouring the nitroleum into the bore-hole alternately with sand, and in this manner fill the hole. It is obvious that as the same fills the hole it becomes saturated from bottom to top with nitroleum, and thus a given charge of nitroleum, which would otherwise be confined to the bottom of the hole, becomes distributed throughout its entire length, and when exploded the force of explosion is similarly distributed. The amount of nitroleum used will, of course, regulate the violence of explosion.

The accompanying drawing illustrates this mode of blasting with nitroleum, representing a drill-hole in rock furnished with blasting and tamping charge.

A is the nitroleum, mixed with sand by introducing both into the same hole, as before described, forming the blasting-charge. B is a small tin canister filled with nitroleum, and furnished with a fuse, D, forming the tamping-charge, and inserted in the sand saturated with nitroleum. C C is sand tamping, employed to keep the canister B in place, and prevent the premature recoil of the exploder B. Any other suitable tamping may be used for this purpose, or for exploding the blasting-charge.

Having thus described my invention, what I claim as new, and desire to secure by Letters Patent, is—

The process of blasting with nitroleum, or nitro-glycerine, consisting in distributing the charge of nitro-glycerine through the bore-hole, substantially in the manner and for the purpose set forth.

TAL. P. SHAFFNER.

Witnesses:

CHAS. M. BURR,

ALFRED RIX.